Figure 1:
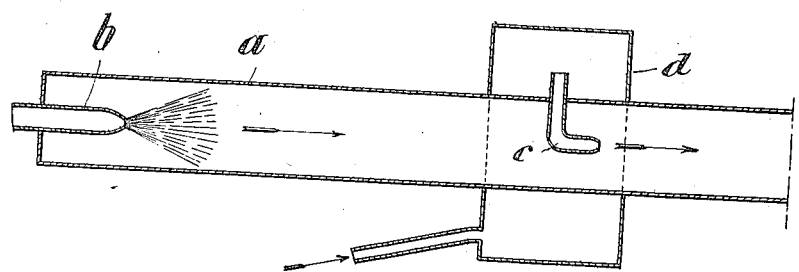

L. P. BASSET.
PROCESS FOR RECOVERING SULFUR DIOXID.
APPLICATION FILED JULY 7, 1913.

1,168,046.

Patented Jan. 11, 1916.

Witnesses

Inventor
Lucien Paul Basset
Attorney

UNITED STATES PATENT OFFICE.

LUCIEN PAUL BASSET, OF MONTMORENCY, FRANCE.

PROCESS FOR RECOVERING SULFUR DIOXID.

1,168,046.

Specification of Letters Patent. Patented Jan. 11, 1916.

Application filed July 7, 1913. Serial No. 777,735.

*To all whom it may concern:*

Be it known that I, LUCIEN PAUL BASSET, a citizen of the French Republic, and resident at 43bis Rue des Chesnaux, Montmorency, France, have invented certain new and useful Improvements in Processes for Recovering Sulfur Dioxid.

The object of this invention is to recover the waste sulfur dioxid in a pure form, which is formed during the process of manufacturing cement from calcium sulfate, clay and coal, as described in a previous application for patent, filed December 17, 1912, Serial No. 737,331.

The usual process of manufacturing cement from calcium carbonate comprises two steps: the decomposition of carbonate of lime and the combination of liberated lime with the elements of clay; although this latter operation requires a very high temperature, say about 1400 to 1500° centigrade, this temperature may be easily produced, as to this end it is only necessary to admit the required quantity of air for producing the combustion of the fuel.

If calcium sulfate is employed instead of calcium carbonate, it is not possible to operate under equal conditions and in the same furnaces, as to decompose the plaster, it is necessary to mix the latter with a quantity of coal up to about 10%. The effect of this quantity of coal is to partly convert calcium sulfate to calcium sulfid, a reducing agent, with production of carbon monoxid. Now it is important that the atmosphere within the furnace contains a quantity of free oxygen which is sufficient to burn the carbon monoxid, as otherwise the latter would reduce the sulfur dioxid formed in the course of the reaction to sulfur and the latter would combine partly with the excess of carbon monoxid, thus producing oxysulfid of carbon. Thus at the outlet of the furnace there would be a mixture of the following gases: carbon dioxid, carbon monoxid, nitrogen, sulfur dioxid and oxysulfid of carbon, which mixture would be of no use. Therefore it is necessary for the purpose of recovering sulfur dioxid in the manufacture of cement from calcium sulfate to have within the furnace a highly oxidizing atmosphere, inasmuch as the subsequent transformation of sulfur dioxid to sulfuric acid requires a further excess of oxygen. The additional quantity of air which is necessary for these reactions, is about 60% of the quantity of air required by the combustion of the fuel of the furnace. It will be easily seen that if this quantity of air be admitted in the usual way into the furnace, the temperature of the latter would be considerably lowered and it would be impossible to obtain the temperature required for the reaction.

This present invention has for its object to provide an improved method complying with the requirements of temperature for the production of cement, at the same time producing sulfur dioxid free from carbon monoxid and therefore directly serviceable.

This process is mainly characterized by the provision in a furnace for the manufacture of cement, of one or more additional air intakes, for the admission of air intended to burn the oxysulfid of carbon and carbon oxid produced by the decomposition of calcium sulfate, this or these additional air-intakes being provided either at the end of the furnace or in an auxiliary chamber connected to said furnace-end so that the temperature of the furnace is not lowered by the admission of additional air. Furthermore by adjusting the additional air admission it is possible to produce variations in the composition of the gases produced by the decomposition of plaster, without modifying the operation of the furnace.

In order to facilitate comprehensibility, I have illustrated diagrammatically in the accompanying drawings the application of my invention to a rotary furnace used for the manufacture of cement.

Figure 2:
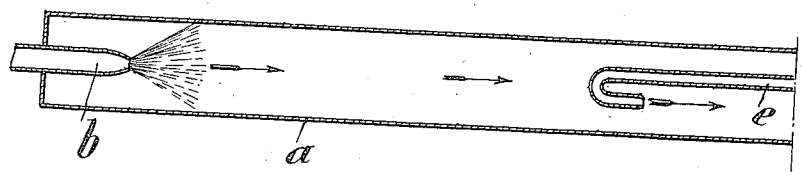

Referring to Figure 1 of these drawings, the furnace $a$ has at one end a nozzle $b$ through which the fuel and combustion air are injected, the quantity of air being just sufficient to burn the fuel and produce a weakly oxidizing flame. Therefore in the hearth of the furnace I produce the temperature which is necessary for combining lime with the elements of clay. Furthermore the furnace has beyond the hearth another nozzle $c$ for the admission of air, which may be injected under pressure. In this case the nozzle $c$ may be arranged to discharge into a chamber $d$, into which air is forced by means of a ventilator. Air may also be introduced through a central pipe $e$, bent at its end as shown in Fig. 2, so that the air injected through this pipe will not counteract the draft of the furnace. Air may also be admitted by suction.

The furnace may be equipped with a plurality of additional air-intakes, arranged over a certain portion of its length, so as to produce an oxidizing atmosphere throughout the length of the furnace.

Through the end of the furnace opposite to the hearth I introduce the mixture of calcium sulfate and clay, to which is added coal. This mixture travels through the furnace in a direction opposite to that of the combustion gases; at the discharge end of the furnace this mixture is first dried; afterward in the part of the furnace where the temperature is raised to about 900° C. the mixture will be decomposed to lime, carbon monoxid and sulfur dioxid, and finally lime will be combined with clay in the hearth where the temperature is raised to 1500° C. to produce cement. The carbon monoxid and sulfur dioxid which are set free by the decomposition of sulfate of lime re-act to produce oxysulfid of carbon. However this oxysulfid of carbon as well as the excess of carbon monoxid and sulfur dioxid meeting with the additional air introduced through the nozzle or nozzles $c$, will be burned, thereby raising the temperature, and at the discharge of the furnace there will only escape together with the gases of combustion sulfur dioxid entirely free from carbon oxid and an excess of air in determinate quantities so that the sulfur dioxid may be converted to sulfuric acid in a lead chamber or any other suitable apparatus arranged in series with the furnace. The combustion of oxysulfid of carbon and carbon monoxid formed within the furnace may also be produced in an auxiliary combustion chamber, connected to the discharge end of the furnace and into which I admit the necessary quantity of air for burning said oxysulfid of carbon and carbon monoxid; said combustion air may be introduced in a cold state or previously heated. As the gases are discharged from the furnace at a rather high temperature and as the combustion of carbon monoxid contained therein produces also a considerable quantity of heat, it will only be necessary to light these gases once within said auxiliary combustion chamber.

As already mentioned above this present invention provides means for producing sulfurous gases which may be used directly and also means for controlling the composition of the gases produced within the furnace, independently from those of the hearth. Thus, for example, if the heat of the furnace is temporarily lowered, the reaction of decomposition will be necessarily retarded, and however the composition of the gases may be maintained at a constant degree by reason of the possibility of varying the quantity of air introduced into the furnace through the additional air-intakes.

I wish it to be understood that a rotary furnace has been described merely by way of example and that the invention may be used in connection with any other furnace.

I claim:

1. A process for obtaining sulfur dioxid as a by-product incidental to the manufacture of cement and calcium sulfate, clay and carboniferous material in a furnace, which consists in injecting into the furnace at a certain point therein a supply of air, the zone of air injection having a temperature conducive to rapid chemical re-action without possibility of decomposition of the hereinafter mentioned compounds, whereby oxysulfid of carbon and carbon monoxid which is formed during the heating of the cement mixture may be readily oxidized into sulfur dioxid and carbon dioxid.

2. A process for obtaining sulfur dioxid as a by-product incidental to the manufacture of cement from calcium sulfate, clay and carboniferous material in a furnace, which process consists in introducing into the furnace at a point therein where the temperature is approximately 900° C. a supply of air, whereby the oxysulfid of carbon, and carbon monoxid gases, which are evolved by the heated cement mixture at this point of the furnace, are oxidized into sulfur dioxid and carbon dioxid.

In testimony whereof I have set hereunto my hand in presence of two witnesses.

LUCIEN PAUL BASSET.

Witnesses:
 HANSON C. COXE,
 RENÉ THIRIOT.